(12) United States Patent
Dobson et al.

(10) Patent No.: US 6,929,273 B2
(45) Date of Patent: Aug. 16, 2005

(54) FASTENER

(75) Inventors: Kenneth S. Dobson, Chicago, IL (US); Jason K. Trotter, Des Plaines, IL (US)

(73) Assignee: Illinois Tool Works Inc., Glenview, IL (US)

( * ) Notice: Subject to any disclaimer, the term of this patent is extended or adjusted under 35 U.S.C. 154(b) by 168 days.

(21) Appl. No.: 10/316,794

(22) Filed: Dec. 11, 2002

(65) Prior Publication Data

US 2003/0127817 A1 Jul. 10, 2003

Related U.S. Application Data

(60) Provisional application No. 60/347,619, filed on Jan. 10, 2002.

(51) Int. Cl.$^7$ ................................................ B60G 3/04
(52) U.S. Cl. ............................ 280/124.13; 280/124.152
(58) Field of Search ........................ 280/93.502, 93.508, 280/93.51, 93.511, 124.166, 124.13, 124.137, 124.149, 124.152, FOR 178; 403/76, 77, 90, 122

(56) References Cited

U.S. PATENT DOCUMENTS

| | | | |
|---|---|---|---|
| 2,213,004 A | 8/1940 | Hickman | |
| 2,839,293 A | 6/1958 | Cover | |
| 2,852,269 A | 9/1958 | Gaines | |
| 2,858,142 A | 10/1958 | Schjolin et al. | |
| 3,025,078 A | 3/1962 | Allison | |
| 3,770,291 A | 11/1973 | Kramer | 280/124 B |
| 4,415,178 A | 11/1983 | Hatsushi et al. | 280/664 |
| 4,842,298 A | 6/1989 | Jarvis | 280/689 |
| 5,215,328 A | 6/1993 | Bono et al. | 280/717 |
| 5,411,154 A | 5/1995 | Vargo | 211/189 |
| 5,609,331 A | 3/1997 | Hoag et al. | 267/154 |
| 5,702,121 A | 12/1997 | Song | 280/689 |
| 6,007,080 A | 12/1999 | Kincaid et al. | 280/124.152 |
| 6,123,352 A | 9/2000 | Muzio | 280/124.152 |
| 6,254,114 B1 | 7/2001 | Pulling et al. | 280/93.511 |
| 6,308,972 B1 | 10/2001 | Kincad et al. | 280/124.107 |
| 6,739,788 B1 * | 5/2004 | Hagemes et al. | 403/122 |

FOREIGN PATENT DOCUMENTS

| | | |
|---|---|---|
| DE | 198 53 411 A1 | 5/2000 |
| EP | 0 943 826 A1 | 9/1999 |
| JP | 02283517 | 11/1990 |
| JP | 08295116 | 12/1995 |
| JP | 08127220 | 5/1996 |
| JP | 09112524 | 5/1997 |

* cited by examiner

*Primary Examiner*—Eric Culbreth
(74) *Attorney, Agent, or Firm*—Mark W. Croll; Paul F. Donovan

(57) ABSTRACT

A method and structure for installing an automotive suspension member is herein disclosed. A fastener used to couple a link member includes a head, a shaft extending from the head and a self-holding mechanism that prevents rotation of the fastener when it is engaged with an aperture formed through a mating member. The self-holding mechanism obviates the need for more than one tool for installing the link member.

3 Claims, 2 Drawing Sheets

Fig 5 A-H

FASTENER

CROSS REFERENCE TO RELATED APPLICATIONS

This application is related to and claims the benefit of Provisional Application Ser. No. 60/347,619 filed on Jan. 10, 2002.

FIELD OF THE INVENTION

The present invention relates to a method and structure for installing fasteners in inaccessible locations. More particularly, the present invention relates to a method and structure for installing automotive suspension mechanisms.

BACKGROUND OF THE INVENTION

Installing threaded fasteners in hard to reach places has always been difficult. This is especially so where multiple tools are required to install the fastener. A typical scenario of this type requires a first tool, such as a box end wrench or the like, to be engaged with a head of the fastener to prevent rotation of the fastener as a second tool threads a nut onto the shaft of the fastener. This is not difficult where the threaded fastener is readily accessible. However, where the fastener is located in a hard to reach location, such as within the undercarriage or suspension of an automobile or other similar location, the installation of a threaded fastener may be extremely difficult, resulting in damage to the fastener, injury to an installer, and may sometimes require specialized tools.

Where a fastener is difficult to access, or where the head of a fastener may not be grasped for fear of damage, grasping structures have been formed on the shaft of the fastener. As can be seen in FIG. 2, one prior art structure includes a squared tip 12 on the shaft 14 of the prior art fastener 10. In use, a nut 16 is first threaded onto the shaft 14 of the prior art fastener 10 past the squared tip 12 until the nut 16 abuts the structure 20 through which the prior art fastener 10 is received. At this point, an installer addresses a first tool, such as a box end wrench (not shown), to the squared tip 12 of the fastener 10 so as to prevent rotation of the fastener 10 as a second tool is used to drive the nut 16 onto the shaft 14 until an appropriate amount of torque has been applied to the nut 16.

Unfortunately, where a fastener such as prior art fastener 10, is installed in an awkward position, such as where one or more fasteners are used to secure a link member in an automobile suspension system such as, for example, an end link of a sway bar assembly between an automobile suspension and a stabilizer bar, it becomes awkward or even impossible to utilize two tools in the installation of the fastener. In these types of situations, it would be desirable to provide a structure on a fastener that prevents rotation of the fastener relative to the stabilizer bar or automobile suspension. In this manner, an installer of the link member need use only a single tool, such as a box end wrench or torque wrench, to properly seat a nut on the fastener.

SUMMARY OF THE INVENTION

The present invention is realized in a fastener system that prevents relative rotation between the fastener and an aperture in which the fastener is received. The prevention of relative rotation between the fastener and the aperture in which it is received obviates the need for more than a single tool in installing this fastener. In a preferred embodiment, the present invention comprises a fastener having a head from which extends a shaft. The head of the fastener is captured in an associated receptacle in an end of a link member of a suspension assembly to form a joint therebetween. The shaft of the fastener is preferably threaded and has formed thereon adjacent the head a non-circular portion. The non-circular portion of the fastener is constructed and arranged to engage a complementarily shaped inner surface of an aperture into which the fastener has been inserted such that when the non-circular portion of the fastener and the similarly shaped interior surface of the aperture are operatively engaged, there can be no rotation of the fastener within the aperture. To achieve this end, the non-circular portion of the fastener may have a "D" shape, a double "D" shape, a hexagonal, square, splined, multi-faceted, triangular, or multi-lobular shape.

Such a fastener facilitates a simplified method for installing a suspension link member in an automobile that requires only a single tool at any given time for the installation thereof. Obviously, before beginning, any preexisting suspension assembly that is installed in the vehicle must be removed or disassembled. Once this has been accomplished, the method of the present invention may be implemented. The first step of the present invention is to provide a suitable suspension system that will impart the desired handling characteristics to the automobile. In one embodiment, a stabilizing bar is secured to the frame of the automobile, as by slip fit bushings, in such a manner as to allow the stabilizing bar to rotate about a longitudinal axis thereof. A pair of end links is next coupled to the respective ends of the stabilizer bar using fasteners constructed and arranged according to the present invention. In a preferred embodiment, the fasteners used to secure the end link to the stabilizer bar have a head that is captured in a socket in the end of the end link. Each fastener has a shaft that extends from its head and has a non-circular portion that is formed in the shaft adjacent to the head or perhaps between the shaft and the head. The non-circular portion of the shaft of the fastener is constructed and arranged to operatively engage an aperture formed through the end of the stabilizer bar that has a similarly shaped inner surface. The operative engagement of the non-circular portion of the fastener with the complementarily formed inner surface of the aperture in the stabilizer bar prevents the rotation of the fastener with respect to the stabilizer bar. A standard nut is then threaded onto the shaft of the fastener and the appropriate torque is applied thereto using only a torque wrench or a box-end wrench. To complete the installation, the remaining free ends of the end links are coupled to a lower control arm of the automobile's suspension using either a fastener constructed and arranged according to the present invention as previously described, or with a standard prior art fastener as is known. Although the invention has been summarized in conjunction with a stabilizer bar, the invention can be utilized with other members, including other linking members of an automobile suspension system.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

Figure 1:
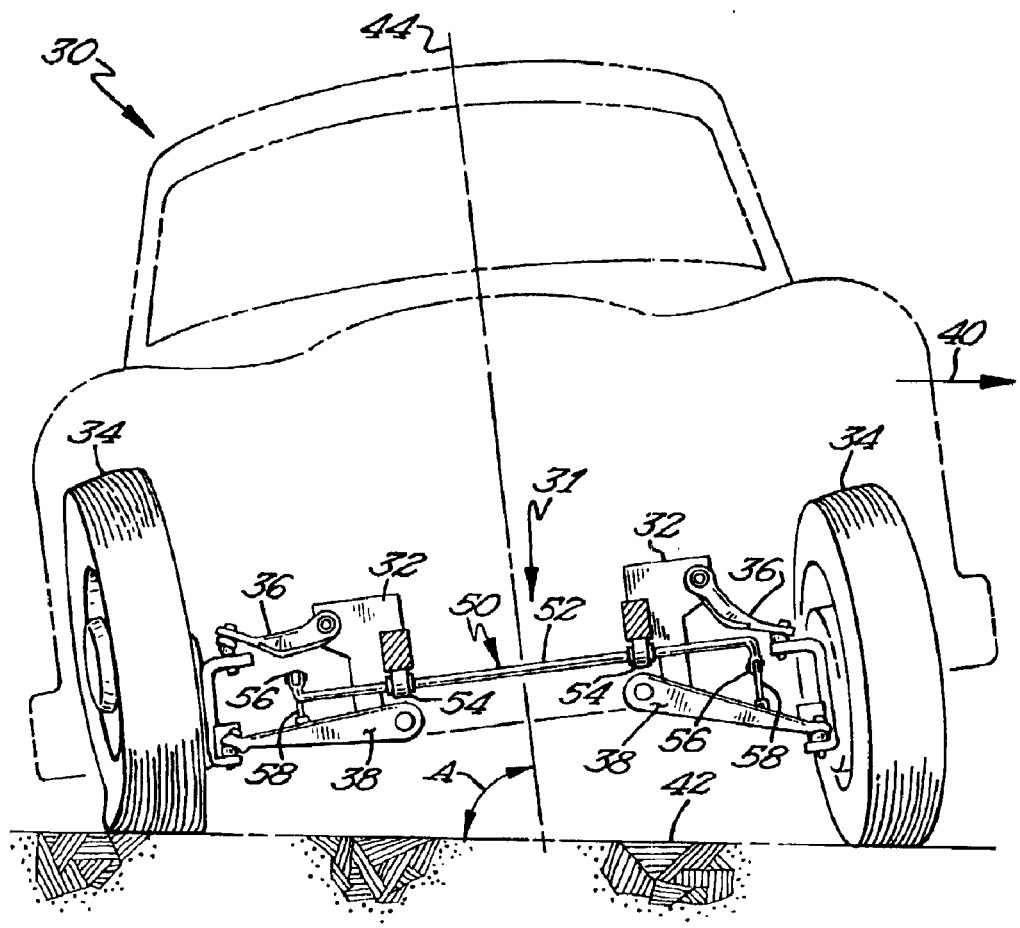
FIG. 1 is a schematic view of an automobile illustrating a typical prior art automobile suspension having a sway bar assembly coupled thereto.
Figure 2:
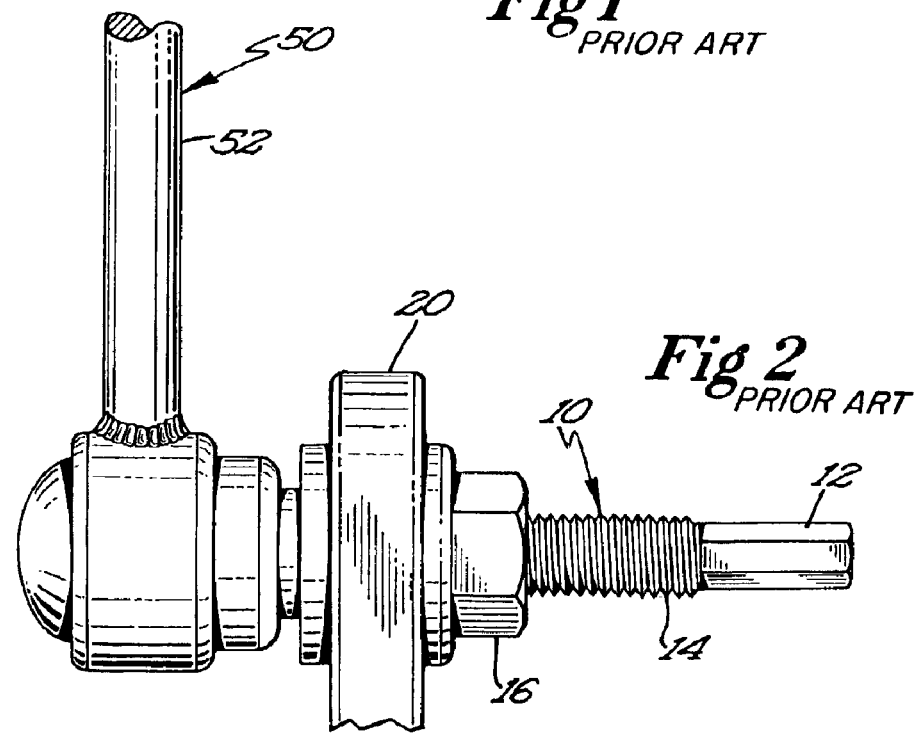
FIG. 2 is a partial cross-sectional view of a prior art fastener.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting.

DETAILED DESCRIPTION

FIG. 1 illustrates an automobile 30 that is in the course of making a turn. As the automobile 30 negotiates a curve in the direction indicated by arrow 40, the automobile 30 tilts away from the direction of the curve as indicated by the angle A created between the horizontal surface 42 upon which the automobile rests and the mid-plane 44 of the auto 30. The rotation of the automobile 30 is caused by centrifugal effects that are applied to the automobile 30 in a direction opposite that of the curve 40.

The automobile 30 is provided with a suspension system 31 that is capable of accommodating the centrifugal effects described above. The exemplary suspension system 31 comprises a frame 32 and wheels 34 that are coupled to the frame 32 by independent suspension mechanisms that include an upper control arm 36 and a lower control arm 38. As shown, the rotation of the automobile 30 to angle A causes the suspension of the left-hand wheel 34 to be compressed upwardly, whereas the suspension of the right-hand wheel 34 extends downwardly. In order to minimize the rotation defined by angle A, a sway bar assembly 50 comprising a stabilizing bar 52 may be coupled between the respective lower control arms 38. The stabilizing bar 52 is rotatably coupled to the frame 32 of the automobile 30 by bushings 54. These bushings allow the stabilizing bar 52 to rotate freely with respect to the frame 32 of the automobile and to have some degree of lateral motion as well. The ends 56 of the stabilizing bar 52 are coupled to end links 58, which are in turn secured to the lower control arms 38 of the respective right and left wheels 34. In this manner, the right and left lower control arms 38 are resiliently coupled through the stabilizing bar 52 so as to limit the rotation of the automobile 30 as it negotiates a curve.

Figure 3:
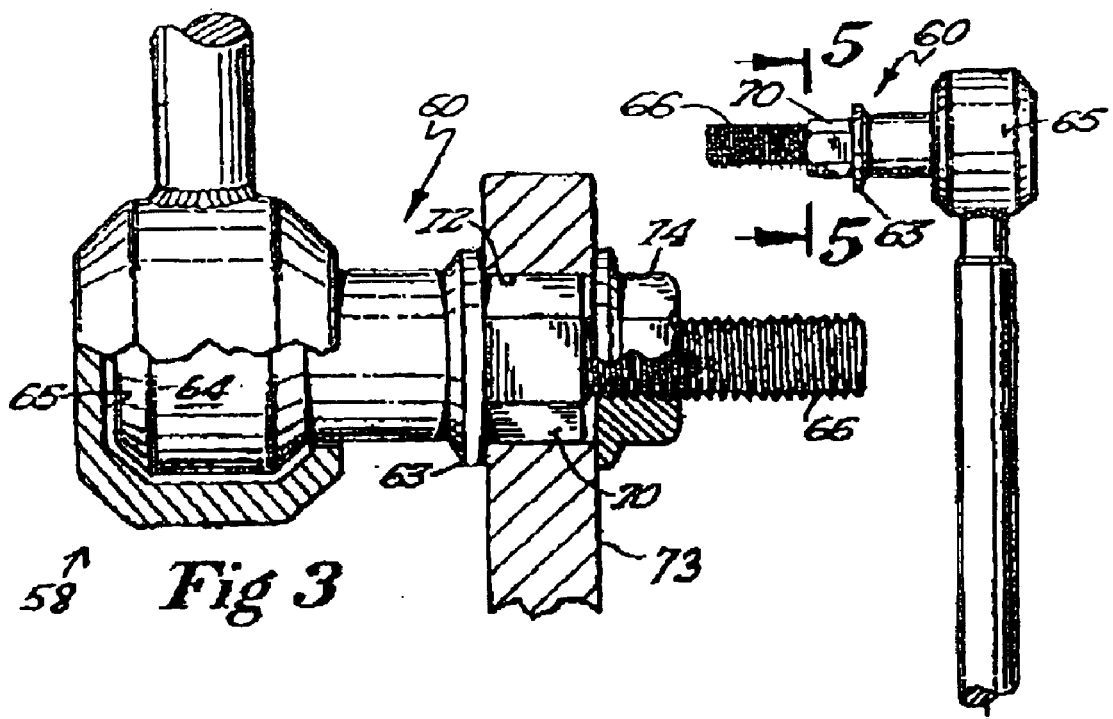
FIG. 3 is a partial cross-sectional view of a fastener of the present invention.

FIG. 3 is a partial cross-section of an end link 58 and an appurtenant fastener 60 that has been adapted to allow installation with only a single tool according to the present invention. Fastener 60 comprises a head 64 from which extends a shaft 66. Between the head 64 and the shaft 66 there is formed a non-circular portion 70. The fastener 60 may also be provided with a shoulder 63 that limits the insertion of the shaft 66 of the fastener 60 into a bore or aperture 72. The non-circular portion 70 of the fastener 60 is constructed and arranged to engage an interior surface of an aperture 72 formed in a suspension member 73, which can be, for example, stabilizer bar 52 or lower control arm 38 or other linking member, as the case may be. The non-circular portion 70 of the fastener 60 and the interior surface of the aperture 72 in which it is received are complementary with one another in that their engagement prevents relative rotation between the fastener 60 and the aperture 72.

Figure 4:
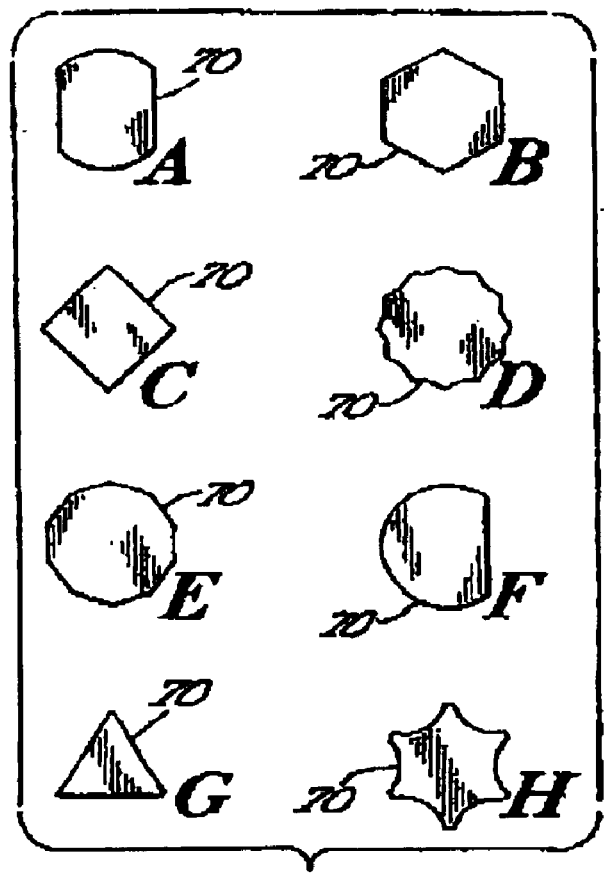
FIG. 4 is a plan view of an end link of a sway bar assembly incorporating fasteners of the present invention; and, FIGS. 5A–H are cross-sectional views of non-circular structures of the fastener of the present invention taken along lines 5—5 of FIG. 4.
Figure 4:
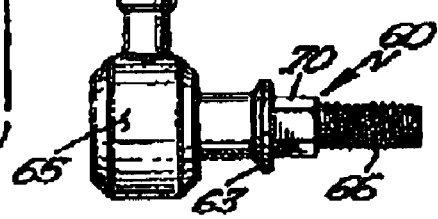

As can be seen in FIG. 3, the head 64 of fastener 60 may comprise the ball portion of a ball and socket joint. Alternatively, a ring link or bushing link or any other suitable joint member could be utilized. The end link 58 comprises a socket 65 or other associated receptacle into which head 64 of fastener 60 is rotatively received. The ball and socket coupling of the fastener 60 to the end link 58 allows for relative movement and misalignment that might otherwise damage the sway bar assembly 50. The end link 58, as shown in FIG. 4, may comprise a ball and socket joint with the head 64 of a fastener 60 received in a socket 65 at each end. Alternatively, the end link 58 may utilize a single fastener 60 to secure the end link 58 to the stabilizer bar 52 and a standard, prior-art fastener to secure the remaining end of the end link 58 to the lower control arm 38, or vice versa.

The cross-sectional shape of the non-circular portion 70 of the fastener 60 may take many forms. A number of these forms are illustrated in FIGS. 5A–H. FIG. 5A illustrates a non-circular portion 70 having two flats formed therein in a configuration that is commonly referred to as a "double D" configuration. FIG. 5B illustrates a hexagonal non-circular portion 70 while FIG. 5C illustrates the non-circular portion 70 as being four-sided and square. FIG. 5D illustrates a "splined" non-circular portion 70 that includes longitudinal splines. FIG. 5E illustrates a non-circular portion 70 that is multi-faceted. Note that the non-circular portion 70 may have any suitable number of facets. FIG. 5F illustrates a non-circular portion 70 having a single facet and FIG. 5G illustrates a non-circular portion having three facets that form a triangle. FIG. 5H illustrates a non-circular portion 70 having a multi-lobular cross-sectional shape similar to the splined non-circular portion 70 illustrated in FIG. 5D. It is to be understood that the cross-sectional shape of the non-circular portion 70 is not to be limited to those illustrated in FIGS. 5A–H.

Using the fastener 60 of the present invention, a sway bar assembly 50 may be easily installed. The first step in this process is to remove the existing sway bar assembly, if any exists. Next, bushings 54 are placed on the stabilizing bar 52 in predetermined positions dictated by the mounting locations provided on the frame 32 of the automobile 30. The bushings 54 are then installed by driving one or more fasteners into the frame 32. Note that the bushings 54 may be installed using standard fasteners or fasteners 60 that are constructed and arranged according to the present invention. In the case (not shown) in which fasteners 60 are used, the shafts 66 of the fasteners 60 are inserted into a bore 72 formed through the bushing 54 and the frame 32 such that the non-circular portion 70 of the fastener 60 engages the interior of the bore 72 formed through the bushing 54 and the frame 32. A nut 74 is then threaded onto the shaft 66 of the fastener that extends through the frame 32. Once the nut 74 is substantially in its desired position abutting the frame 32 of the automobile, a single tool such as a box end wrench or a torque wrench may be used to tighten the nut 74 to a predetermined torque level.

After the stabilizer bar 52 has been coupled to the frame 32 of the automobile 30, an end link 58 is coupled to each end 56 of the stabilizer bar 52. A fastener 60 is connected to each end link 58 by capturing head 64 in socket 65. One end of fastener 60 thereby is connected to stabilizing bar 52.

Alternatively, the structures illustrated in the exemplary embodiment shown can be reversed. In such embodiment, the shaft 66 of a fastener 60 is inserted into an aperture 72 formed through the end 56 of the stabilizing bar 52 until the non-circular portion 70 of the fastener 60 engages the interior of the aperture 72. Once the non-circular portion 70 of the fastener 60 is engaged in the aperture 70, a nut 74 is threaded onto the shaft 66 and tightened using only a single tool such as a torque wrench or box end wrench.

Next, the end link 58 is coupled to the lower control arm 38, preferably using a fastener 60, though it is to be understood that the end link 58 may be secured to the lower control arm 38 using other types of fasteners. However, where fasteners 60 are used, as described above and shown in the drawings, the shaft 66 of the fastener 60 is inserted into an aperture 72 formed in the lower control arm 38 until the non-circular portion 70 of the shaft 66 engages the complementary inner surface of the aperture 72 so as to prevent relative rotation therebetween. Once the non-circular portion 70 of the fastener 60 is engaged in the aperture 72, a nut 74 is threaded onto the shaft 66 and tightened using only a single tool such as a torque wrench or box end wrench.

Although the invention has been primarily described in connection with a sway bar assembly, the invention is capable of use in other applications, in particular, other suspension applications, and the sway bar assembly as shown and described in merely shown and described as an example of one such application. For example, the fastener of the present invention could be used in combination with a strut assembly, an axle assembly, or various other assemblies found within vehicles to name just a few. It should also be understood that the fastener may be employed with various washers, bushings, or other mechanisms necessary to effect a secure connection without exceeding the scope of the present invention.

Thus, it should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

Various features of the invention are set forth in the following claims.

What is claimed is:

1. A method for installing a sway bar assembly in an automobile comprising the steps of:

providing a stabilizing bar having a first end and a second end;

securing the stabilizing bar of the sway bar assembly to a frame of the automobile so as to permit rotation of the stabilizing bar about a longitudinal axis thereof;

providing a pair of end links, each end link comprising a fastener having a head that is captured in a socket formed in an end of the end link, a threaded shaft extending from the head away from the end link, and at least a portion of the shaft adjacent the head having a non-circular shape;

inserting the respective fasteners of the end links into apertures formed in the first and second ends of the stabilizing bar until the non-circular portion of the shaft of the fasteners cooperatively engage complementarily shaped inner surfaces of the apertures so as to prevent relative rotation as between the fasteners and the apertures;

threading a nut onto the shaft of each of the fasteners using but a single tool to do so; and, coupling ends of the respective end links to a pair of lower control arms.

2. The method for installing a sway bar assembly in an automobile of claim 1, further comprising the step of:

coupling remaining free ends of the pair of end links to their respective lower control arms using fasteners having spherical heads that are captured in respective sockets formed in the ends of the end links, threaded shafts extending from the heads away from the end links, and at least a portion of the shafts adjacent the head having a non-circular shape.

3. A method for holding a threaded shaft from rotating within an aperture formed in a linkage member as a nut is tightened on the threaded shaft against the linkage member comprising the steps of:

engaging a non-circular member formed on the threaded shaft with a complementary non-circular structure formed within the aperture such that relative rotation between the linkage member and the threaded shaft is constrained; and, tightening the nut upon the threaded shaft with a single tool;

wherein the linkage member is an end link of a sway her assembly.

* * * * *